US 6,538,607 B2

(54) ADAPTER ANTENNA

(75) Inventor: Zsolt Barna, Budapest (HU)

(73) Assignee: Smarteq Wireless AB, Enebyberg (SE)

( * ) Notice: Subject to any disclaimer, the term of this patent is extended or adjusted under 35 U.S.C. 154(b) by 0 days.

(21) Appl. No.: 09/900,455

(22) Filed: Jul. 9, 2001

(65) Prior Publication Data

US 2002/0063659 A1 May 30, 2002

(30) Foreign Application Priority Data

Jul. 7, 2000 (SE) ................................ 0002575

(51) Int. Cl.⁷ .................................. H01Q 1/24
(52) U.S. Cl. ....................... 343/702; 455/575
(58) Field of Search ................ 343/702, 700 MS, 343/906, 841; 455/575, 90

(56) References Cited

U.S. PATENT DOCUMENTS

| 4,220,955 A | | 9/1980 | Frye | 343/703 |
| 4,542,358 A | * | 9/1985 | Boby | 333/246 |
| 5,557,287 A | | 9/1996 | Pottala et al. | 343/702 |
| 5,668,561 A | | 9/1997 | Perrotta et al. | 343/702 |
| 5,777,585 A | | 7/1998 | Tsuda et al. | 343/702 |
| 5,918,189 A | * | 6/1999 | Kivela | 455/575 |

FOREIGN PATENT DOCUMENTS

| EP | 0399975 A2 | 11/1990 |
| EP | 0999607 A2 | 5/2000 |
| EP | 1006606 A1 | 6/2000 |
| GB | 2266997 A | 11/1993 |
| SE | 500983 | 10/1994 |
| SE | 503930 | 9/1996 |
| SE | 504343 | 1/1997 |
| SE | 506726 | 2/1998 |
| SE | 507100 | 3/1998 |
| WO | WO96/19845 | 6/1996 |
| WO | WO98/25323 | 6/1998 |
| WO | WO98/27610 | 6/1998 |

* cited by examiner

Primary Examiner—Don Wong
Assistant Examiner—James Clinger
(74) Attorney, Agent, or Firm—Jacobson Holman PLLC

(57) ABSTRACT

An adapter antenna (2) is used for contactless connection of a mobile telephone (1) to an external antenna (4) in case the telephone lacks a connector for coaxial cable (3) for such a purpose. The most common application is when a mobile telephone is to be used in a vehicle. Transfer of radio waves occurs in the near field of the built-in antenna (6) of the telephone by capacitive coupling. One preferred embodiment especially suited for plane inverted antennae of type L, E or F is described. An optimizing method for two frequency bands is described.

11 Claims, 6 Drawing Sheets

ADAPTER ANTENNA

BACKGROUND OF THE INVENTION

1. Field of the Invention

The invention concerns an adapter antenna which without contact can receive and transfer an electromagnetic wave within the near field of another antenna. The most common application of an adapter antenna is for connection of a mobile telephone which temporarily is used within a vehicle to an external antenna located on the outside of the vehicle.

2. State of the Art

All mobile telephones are provided with a built-on first antenna, but not all models are provided with a coaxial outlet for connection to an external second antenna. If one wishes to use an external antenna with a mobile telephone lacking such an antenna outlet, an adapter antenna can be located near the first antenna and connected by a coaxial cable (33) to the second antenna.

In the following will be described what is peculiar for an adapter antenna compared to other antennae in general. Antennae are usually located in the far field of a first antenna, where the wave front is approximatively flat with the electric and magnetic field vectors at right angles to each other. In this case, the antennae do not influence the current distribution of each other, and they may be designed independently of each other. An adapter antenna is located close to a first antenna in the near field of this. The electric and magnetic field vectors are here generally not at right angles to each other. The current distributions of the first antenna and the adapter antenna will influence each other. In an ideal case the transfer between the first antenna and the adapter antenna should be total, and all power from the first antenna should be collected by the adapter antenna, which in practise can never be acheived. In case of use in a vehicle, the non-transferred power will radiate into the vehicle. This is a great disadvantage, the radiation has not fully recognized biological effects which were the reason for deciding to use an external antenna. These decribed conditions, which are specific for adapter antenna compared to other types of antennae, mean that adapter antennae should be individually optimized for each type of first antenna. The optimizing may be more difficult if the telephone is of multiple N-band type, where N is larger than 1.

The most common type of antenna for mobile telephones is monopole or small helix. Adapter antella for such are known from patents U.S. Pat. No. 4,220,955, GB 2266967, SE 500983, SE 503930, U.S. Pat. No. 5,557,287, U.S. Pat. No. 5,777,585, SE 504343, and WO 98/25323. These all use a coil as a coupling element. Adapter antennae suitable also for other types of telephone antennae can be shaped as meander convolutions as described in patents SE 506726 and SE 507100.

SUMMARY OF THE INVENTION

Aim and Method of the Invention

The known types of adapter antennae are not optimal for certain types of first antennae, such as inverted L, E and F(PIFA) antennae. Coils are less suitable for adapter antennae to these. One aim of the invention is to acheive an optimal solution by utilizing the electric field component, implying acting as a condenser together with a suitable adaptive circuit. The invention can be used for single as well as multiple frequency band adapter antennae.

The optimizing is made in the following steps:

Determine the smallest condenser plate which can efficiently transfer the power. This is made by calculating or measuring the current distribution of the first antenna and determining the surface or surfaces where the current density is large, and designing the condenser plate of the adapter antenna to have a corresponding surface.

Choose feed point and means for matching the impedance of the coaxial cable, such as 50 ohm. At the other end of the coaxial cable the second antenna or a amplifier unit may be connected.

Provide a suitable ground plane, such as a loop around the condenser plate.

Optimize the adapter antenna while accounting for its influence upon the adaptation of the first antenna in its feed point.

DESCRIPTION OF THE INVENTION

Figure 1:
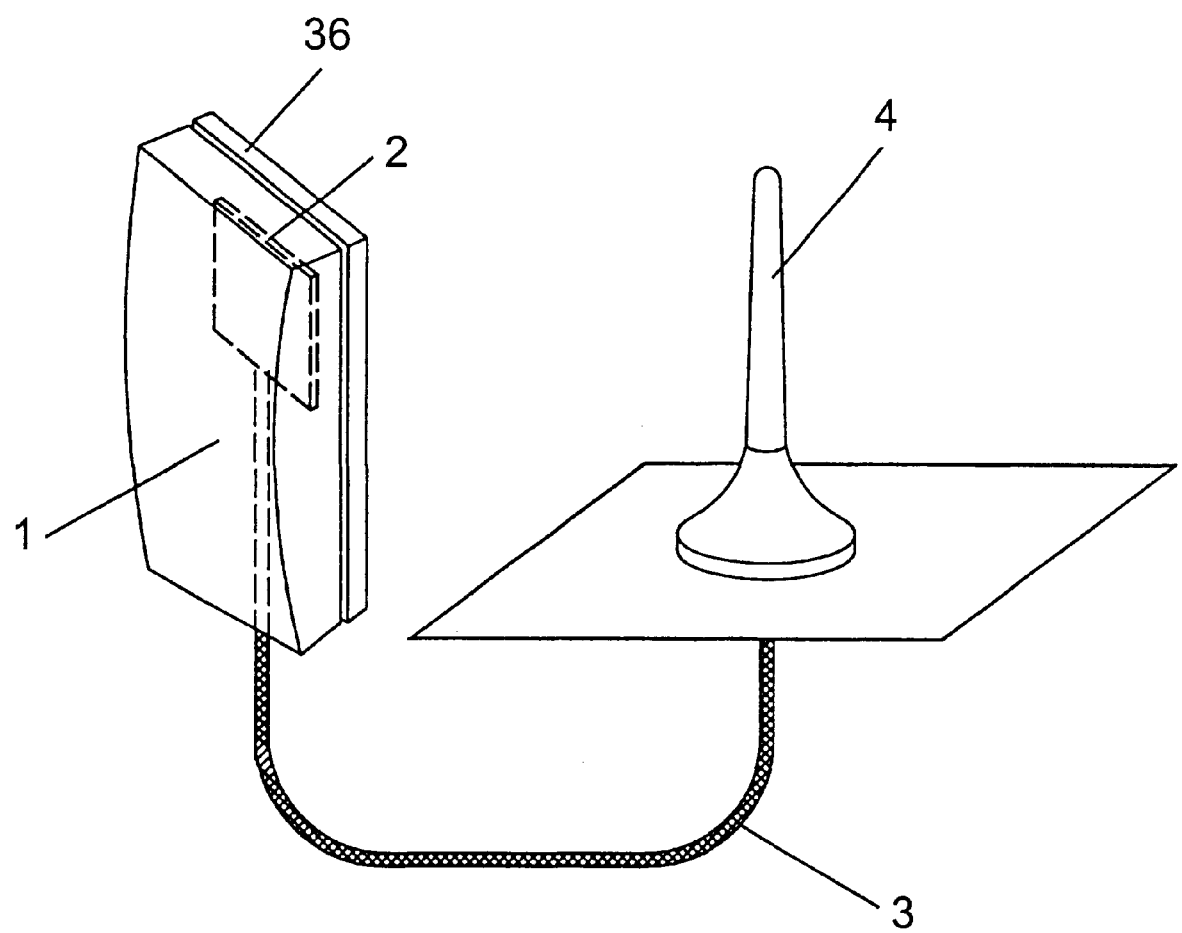
FIG. 1 Mobile telephone with a built-in antenna, and an adapter antenna with a cable to an external antenna.
Figure 2:
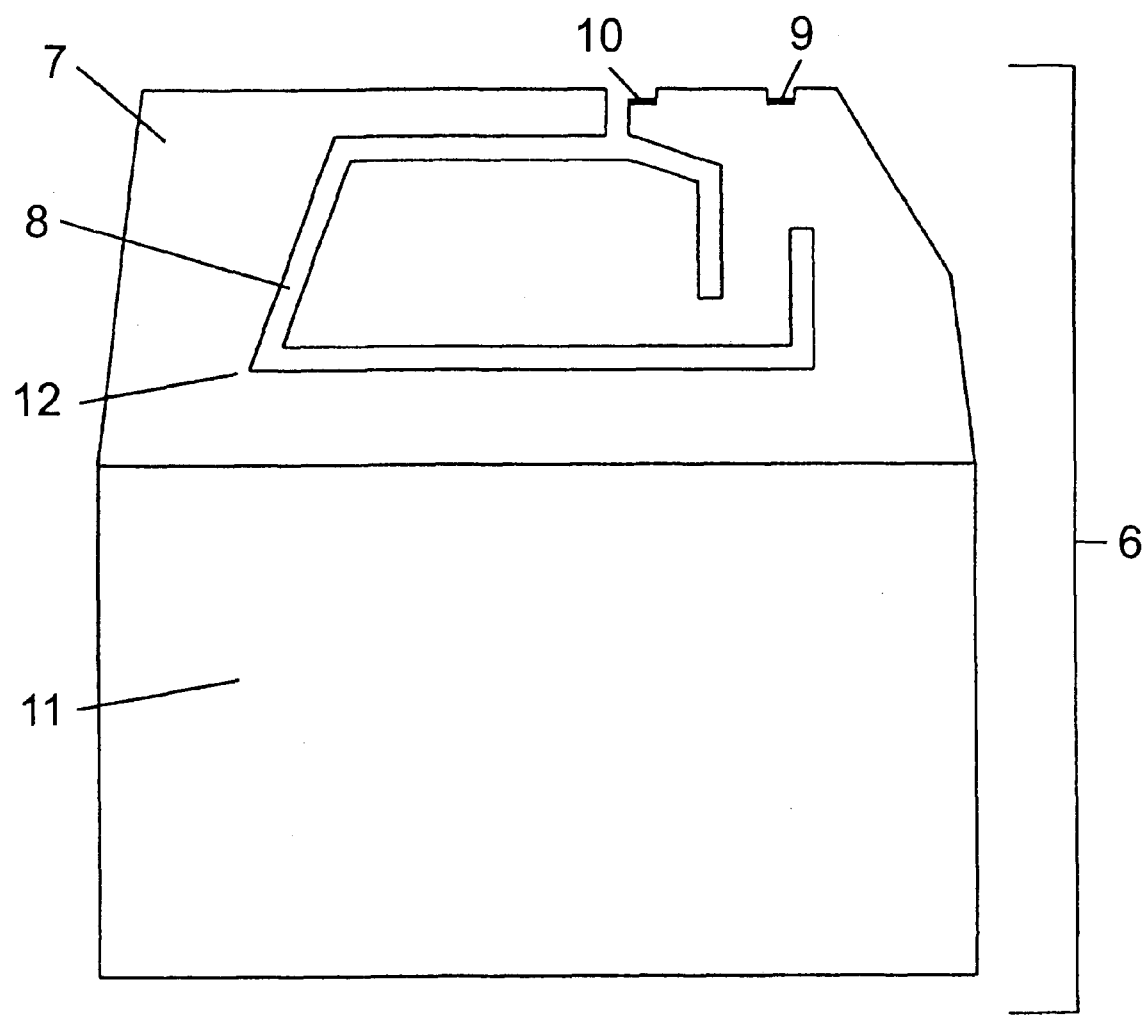
FIG. 2 PIFA-antenna for two frequency bands.

In the following the invention will be described in the context of an adapter antenna of a preferred type for use with a mobile telephone (1) with a built-in PIFA antenna (6) as seen in FIG. 2. The components of the adapter antenna (2) are located on a circuit board (19,20) with circuit patterns of conductive metal on both sides. Alternative embodiments, not shown in a figure, may be circuit boards with conductive pattern on one side only, or metal foil conductors, or plastic boards with conductive surface patterns applied by metallizing, metal spraying, conductive paint or foil. The adaptive circuit at the port (32) is also located on the circuit board in the version shown by FIGS. 5 and 6. Other designs of adaptive circuits with discrete or continuous components are commonly known and will not be discussed here.

Figure 3:
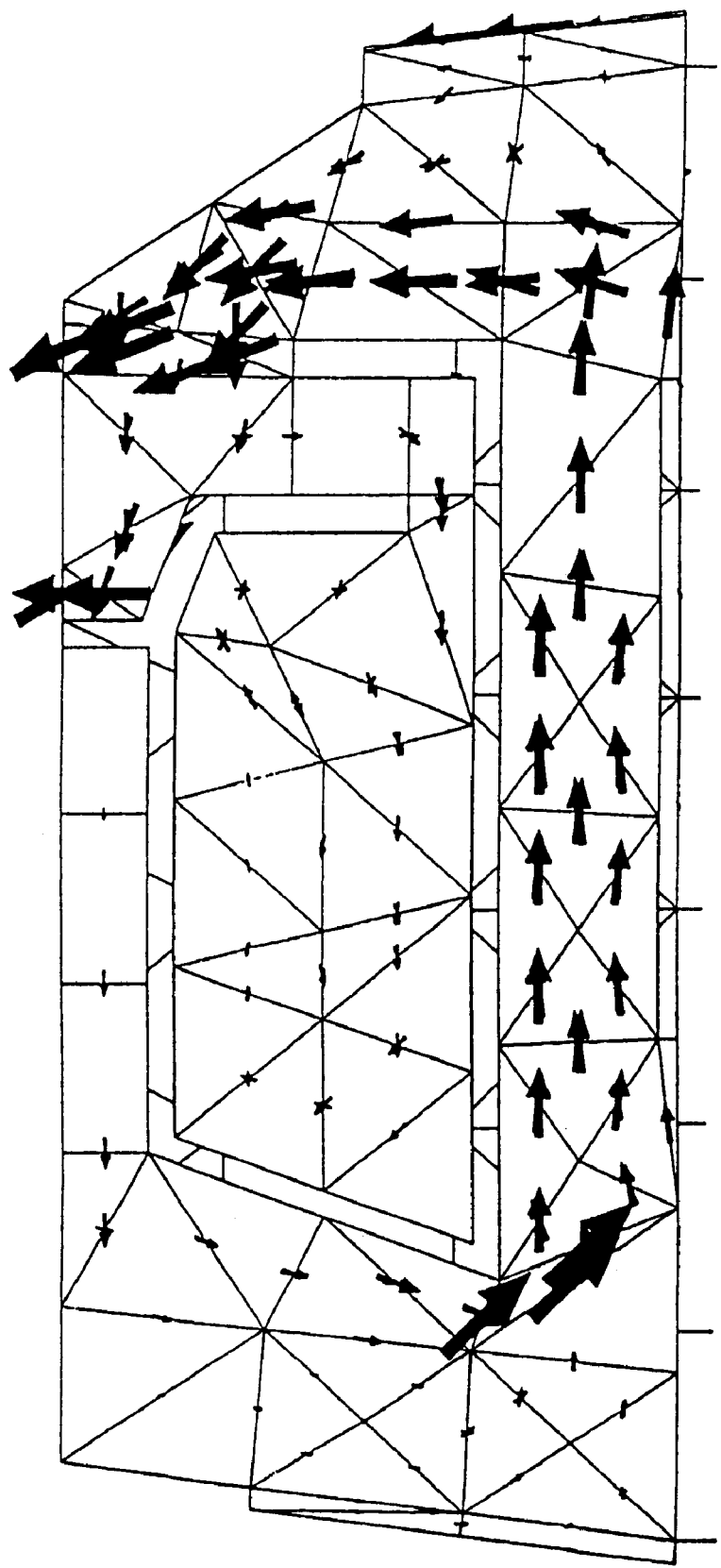
FIG. 3 Current distribution on a PIFA antenna at 900 MHz.
Figure 4:
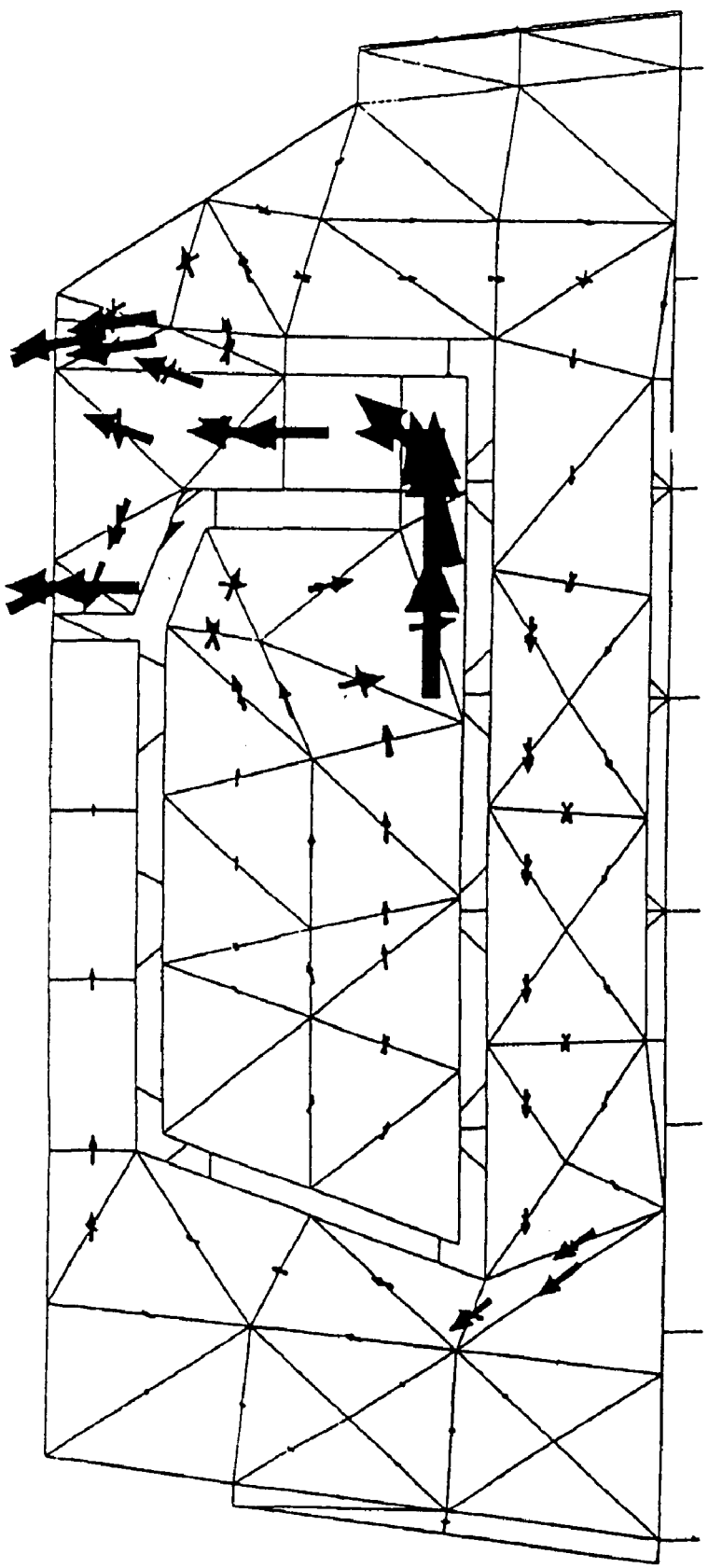
FIG. 4 Current distribution on a PIFA antenna at 1800 MHz.

FIG. 2 shows the PIFA antenna (6) of the mobile telephone (1), comprising a radiator (7) from sheet metal and a ground surface (11). In the radiator (7) is a cut-out slot (8). The radiator (7) is connected to the mobile telephone electronics at the feed point (9) and forms a stub with a ground connection (10). The current distribution while transmitting in the 900 MHz band is shown in FIG. 3 and in the 1800 MHz band in FIG. 4. As was explained in the description of the method of the invention it is desired to have as small a condenser plate as possible in the adapter antenna, though large enough to cover the most active regions of the PIFA antenna. In the 1800 MHz band these are close to the feed point (9) and the stub (10). The same holds for the 900 MHz band but then there is also a region at the corner (12) of the slot (8). It is, however, best to avoid using the field in the vicinity of the corner (12) since that would need a condenser plate too large for 1800 Mhz.

Figure 5:
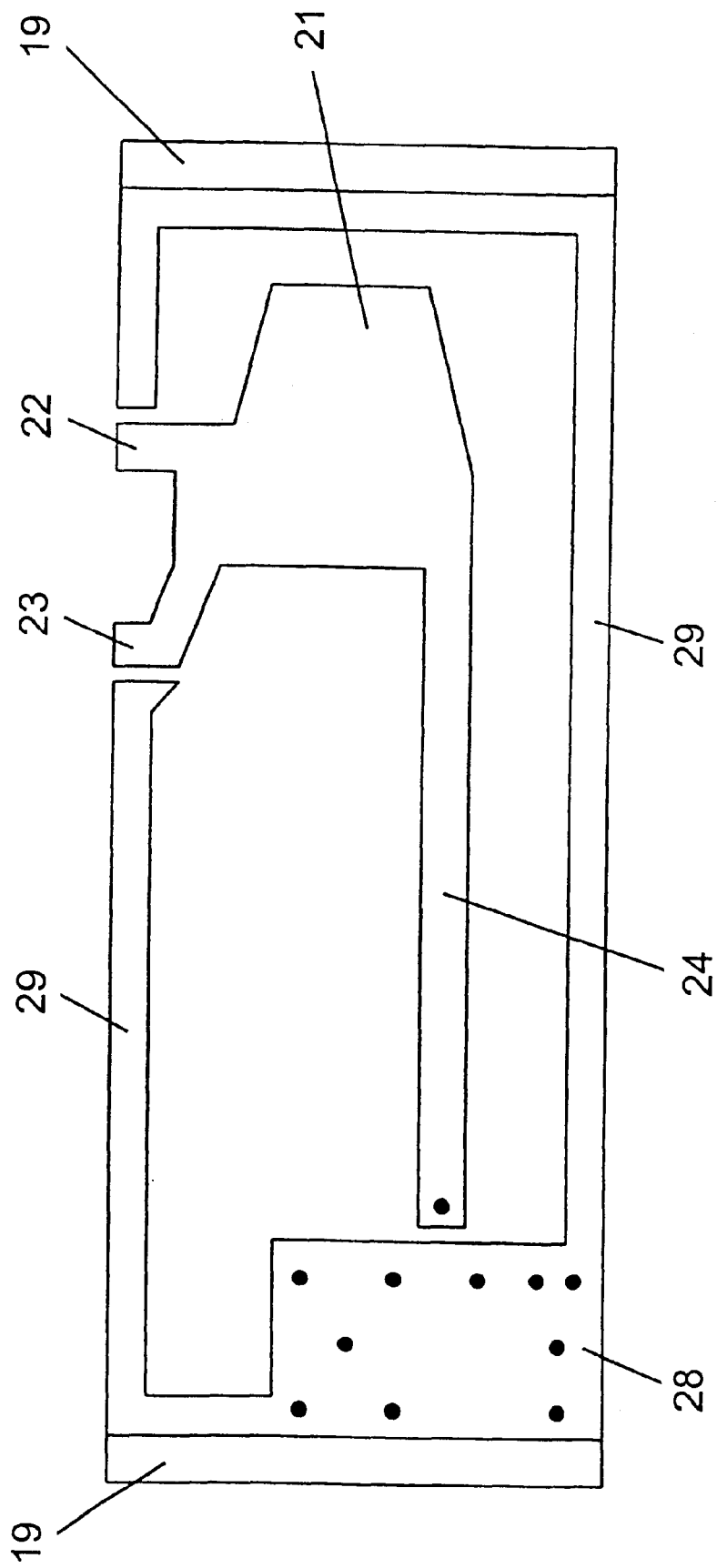
FIG. 5 Pattern on the first side of the circuit board.

This results in a design of the condenser plate (21) as shown in FIG. 5. The condenser plate (21) is located on the first side (19) of the circuit board, which is closest to the mobile telephone (1) when this is placed near the adapter antenna (2). The condenser plate (21) has two horns (22 and 23) of conductive material, covering the high current density regions close to the feed point (9) and the stub (10) of the PIFA antenna (6). In another embodiment not shown here, separate but electrically connected plates are located over the high current regions. The conductor (24) is located above the slot (8) so as not to be noticably influenced by the currents in the antenna (6).

On the first side (19) of the circuit board the ground plane of the adapter antenna is located, comprising a ground plane island (28) and a ground plane loop (29).

Figure 6:
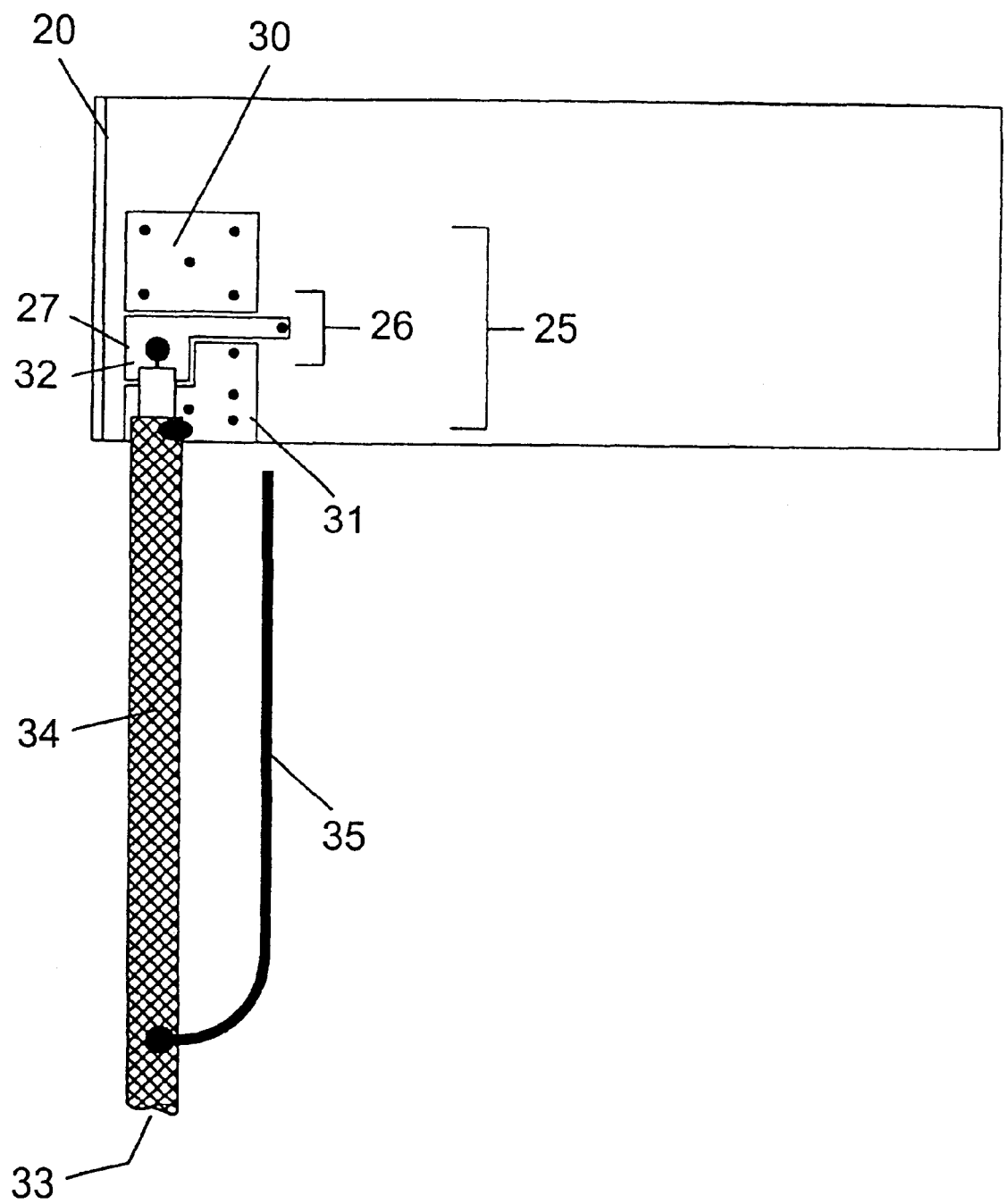
FIG. 6 Pattern on the second side of the circuit board.

On the other side (21) of the circuit board, shown in FIG. 6, is a transfer (25) consisting of a coplanar waveguide (26) comprising a solder island (27) and ground plane islands (30 and 31), as well as a condenser towards ground, comprising a solder island (27) and a ground plane island (28). This condenser will compensate the inductance of the conductor (24). The transfer (25) provides adapting to a 50 ohm coaxial cable. The other end (3) of the coaxial cable may be connected to a second antenna (4) or to an amplifier unit not shown in the figure. Currents in the shield (34) of the coaxial cable (33) can be suppressed by means of a quarter wave trap (35). For use with several frequency bands, several wave traps may be supplied. Another possibility is to use a loss means, such as a ferrite ring, to extinguish any wave that could follow the outside of the shield.

Optimizing the dimensions of the pattern should be made in such a way that not only provides a good transmission from the PIFA antenna (6) to the adapter antenna (2) as well as in the other direction, but also fulfills the demand that the impedance of the PIFA antenna in the feed point (9) should be influenced as little as possible.

List of Numbers

Mobile telephone 1
Adapter antenna 2
Coaxial cable 3
External antenna 4
PIFA antenna 6
Radiator 7
Slot 8
Feed point 9
Stub 10
Ground plane 11
Corner of slot 12
Circuit board, first side 19
Circuit board, second side 20
Condenser plate 21
First horn 22
Second horn 23
Conductor 24
Transfer 25
Coplanar wave guide 26
Solder island 27
Ground plane island 28
Ground loop 29
Ground plane island 30
Ground plane island 31
Port 32
Coaxial cable 33
Shield 34
Wave trap 35
Adapter 36

What is claimed is:

1. An adapter for contact-less transfer of electromagnetic waves between a first antenna built into a mobile telephone and a port of the adapter antenna where a coaxial cable can be connected, the adapter antenna comprising a condenser plate, a conductor connecting the condenser plate with the port and adaptive components including ground plane elements, said first antenna transferring without contact the electromagnetic wave to the adapter and said adapter antenna transferring the electromagnetic wave without contact back to said first antenna by utilizing an electric component of a near field of the first antenna and by shaping the condenser plate surface to correspond as far as possible to those regions of a surface of the first antenna carrying large surface currents, and by having optimal shape and size of the components of the adapting circuit to minimize influence on the matching of the first antenna to telephone electronics.

2. The adapter antenna according to claim 1, for use for one or more frequency bands, adapted to said first antenna of plane inverted F type (PIFA) wherein the condenser plate being shaped to cover surfaces close to a feed point and a stub and those regions of the radiating metal surface of the first antenna where the surface currents are relatively greater than other regions.

3. The adapter antenna according to claim 1, wherein the port is a matching unit, and said matching unit includes a coplanar waveguide and a condenser towards ground.

4. The adapter antenna according to claim 1, further comprises a ground plane augmented by conductive ribbons or wires, or stripes of conductive material following edges of the component carrying the condenser plate.

5. The adapter antenna according to claim 1, further comprises conductive surfaces located on a circuit board.

6. The adapter antenna according to claim 1, further comprises conductive surfaces made of sheet metal.

7. The adapter antenna according to claim 1, further comprises conductive surfaces made by metallizing of plastics.

8. The adapter antenna according to claim 1, further comprises conductive surfaces consisting of conductive paint.

9. The adapter antenna according to claim 1, further comprises conductive surfaces made from foil.

10. The adapter antenna according to claim 1, wherein said coaxial cable is provided with a wave trap which suppresses currents in a shield of the cable.

11. The adapter antenna according to claim 1, wherein said coaxial cable is provided with a component with high internal loss, which suppresses currents in a shield of the cable.

* * * * *